Jan. 18, 1938.  P. K. SAUNDERS  2,105,864
FLUID CONTROLLING VALVE
Filed Oct. 16, 1936
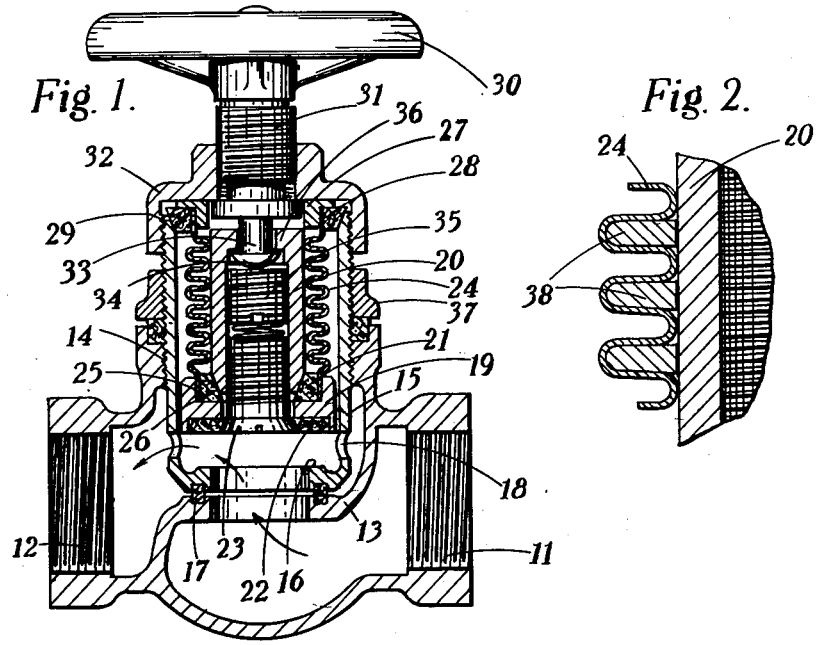
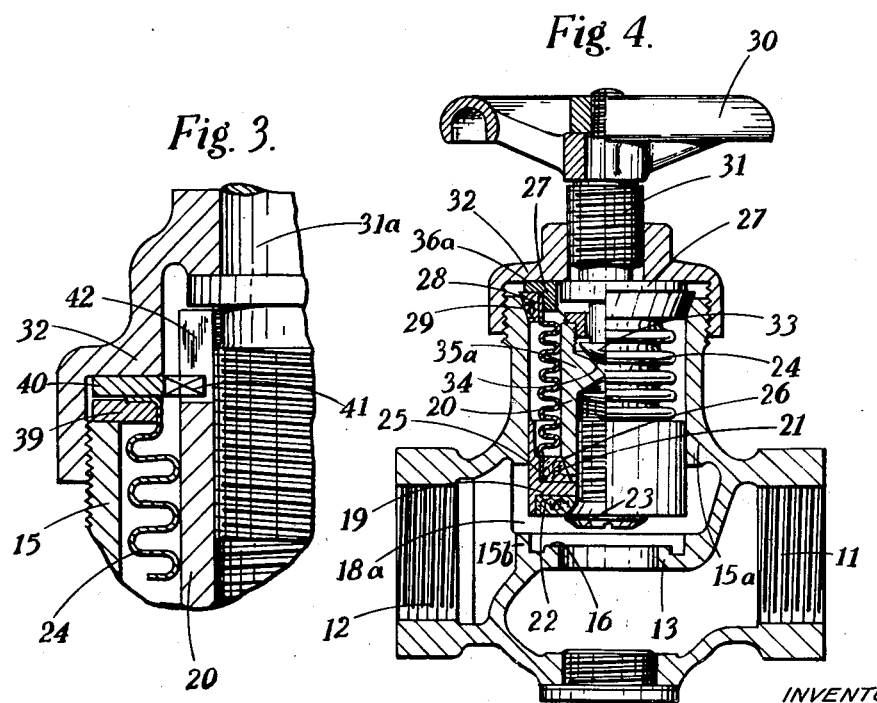
INVENTOR
P. K. Saunders,
BY
Mawhinney & Mawhinney,
ATTORNEYS.

Patented Jan. 18, 1938

2,105,864

UNITED STATES PATENT OFFICE 2,105,864

FLUID-CONTROLLING VALVE

Philip Keith Saunders, Wolverhampton, England

Application October 16, 1936, Serial No. 106,038
In Great Britain November 30, 1935

7 Claims. (Cl. 251—31)

This invention relates to fluid-controlling valves of the kind having an axially-movable valve member connected with the casing or body of the valve by a metal bellows which renders unnecessary the use of any stuffing box for the valve member or for an actuating spindle connected therewith, and which also serves for entirely screening such actuating spindle from the fluid controlled by the valve.

My main object is to provide means by which such valves can be rendered very satisfactory for use in controlling high-pressure steam.

In the accompanying drawing:—

Figure 1 is a longitudinal section through a globe valve, for controlling steam flow, constructed according to the invention;

Figures 2 and 3 are fragmentary sections, to slightly larger scales, showing details hereinafter referred to; and Figure 4 is a longitudinal section of another form of globe valve according to the invention.

Like numerals indicate like parts throughout the drawing, the valve being shown fully open in Figures 1 and 4.

Figure 1 of the drawing shows a valve casing or body with an inlet 11 and an outlet 12, the flow passage passing through an opening in a cross partition 13. Screwed at 14 into an axial flange of the body is a body part comprising a cylinder-like member 15 the lower end of which provides the actual seat 16 of the valve, while the lower face is jointed at 17 to the partition 13 around the opening thereof. Peripheral openings 18 are provided in the cylinder-like member as shown to co-act with the axially-movable valve member which in this case is of piston form.

The valve member is shown as being a built-up one comprising a main ring 19, a sleeve 20, a flexible ring 21 and a seating ring 22, these parts being held together by a screw 23.

The metal bellows 24 has at its lower end an axially-extending flange 25 which becomes firmly clamped between main ring 19 and a flexible ring 21 as the screw 23 is tightened to force the flexible ring 21 axially, the flexible ring 21 and the lower end of the sleeve 20 having a wedge-like engagement at 26. The bellows is internally supported along the whole of its length by the sleeve 20, the steam pressure leaking past the main ring 19 being applied to the outer surface of the bellows. In a rather similar manner the outer end of the bellows is clamped between a metal ring 27 and a flexible ring 28, this latter having a wedge-like engagement at 29 with the adjacent end of the body member 15. Both the rings 21, 28 may be of fibre or annealed copper or brass.

It may here be mentioned that one aspect of the present invention involves the use of a metal bellows 24 which is clamped and not soldered to the axially-movable valve member and the body of the valve, respectively. The ordinary metal bellows is formed by the upsetting of a thin metal tube the ends of which are left cylindrical and of a diameter which is roughly the mean of the maximum and minimum diameters of the corrugations. The limit to which the metal can be stretched is, of course, dependent upon its thickness and it is impracticable, in ordinary conditions, to bend the ends inwardly or outwardly to a greater extent than the minimum or maximum diameter, respectively, of the corrugations. A further feature of the invention involves means for clamping at least one of the ends of such a metal bellows between two rings without the end being bent beyond the appropriate limit. Provision should be made for protecting the bellows from torsional movement.

Figure 1 shows the valve member when fully open. The pressure of the steam controlled by the valve serves for moving the valve member in the opening direction when a hand-wheel 30 is turned in the opening direction. The hand-wheel 30 is fast with an actuating spindle 31 having a screw-threaded engagement with a cap 32, fast on the outer end of the body member 15, so as to be travelled axially on being rotated. The spindle end carries a pin 33 formed at its lower extremity with a part-spherical surface 34 engaged with a block 35 screwed into the interior of the sleeve 20, such that when the actuating wheel 30 is turned in the closing direction the point or ball engagement between the pin 33 and the block 35 will force down the movable valve member whilst subjecting it to a minimum of torsion. In this way the bellows is also subjected to a minimum of torsion.

It may here be mentioned that the sleeve 20 is inturned at 36, the inturned portion being spaced from the head of the pin 33, but the latter can engage it positively to withdraw the valve member if the pressure of the fluid controlled by the valve should be insufficient for moving the valve member.

It should also be noted that the cylinder-like member 15 and co-acting piston valve screen the bellows at all times from the flow of the steam controlled by the valve. Thus only stagnant steam will be applied to the bellows.

Moreover, the "globe" valve is designed so that the movement of the valve member to fully open the valve is approximately only one quarter of the bore of the valve. That is to say, if the bore of the inlet 11 or outlet 12 is, say, 2 inches in diameter, the valve is arranged so that a movement of one-half inch on the part of the valve member will provide full flow area through the valve. In other forms of globe valve with which I am familiar the actual seating surface of the valve member is usually a resilient one held in position by a bolt the head of which extends into the opening through the main valve seat, when the valve is closed, the bolt head thus being in the way of the fluid flow when the valve is opened such that a greater opening movement has to be applied to the valve member to provide the full opening required. In my valve, however, the head of the bolt 23 is streamlined or preferably countersunk so that a relatively small movement of the valve member is sufficient to provide full flow area through the valve.

Furthermore, when moving the valve member in the closing direction the main flow of the steam is cut off by the piston portion 19 of the valve member covering the ports 18 before the seating ring 22 seats, so that the seating ring 22 and seat 16 do not by themselves have to break the main flow of the steam. In this way the main seat 16 and the part 22 of the movable valve member which co-acts with it are protected, during the initial opening or final closing of the valve, from the main flow of the fluid controlled by the valve, owing to the valve member being formed as a piston valve which co-acts with the openings 18 in the shielding cylinder 15 but does not begin to open these openings until the valve member has moved some distance from the main seat 16. The cylinder openings 18 are preferably so arranged that full flow area through the valve will be obtained when the piston valve is withdrawn from the fully-closed position by an amount equal to one quarter of the normal bore of the valve.

It should also be noted that, in the construction of Figure 1, in order to dismantle the parts it is only necessary to unscrew a nut 37 on the cylinder-like member 15. When this has been unscrewed sufficiently far to engage the cap 32, further unscrewing movement causes the cylinder-like member itself to unscrew from the body of the valve, thus permitting the cylinder-like member, the bellows, the valve member and the actuating mechanism therefor to be removed together.

Figure 2 shows a part of the bellows 24 when fully collapsed, the outer convolutions thereof being supported by rings 38 slidable on the sleeve 20. A convenient method of inserting these rings is to mount the bellows on a hollow mandrel with appropriate radial openings in it and to pour white metal down the interior and through the openings, after first coating the interior surface of the bellows as necessary, allowing the white metal to set to form the rings 38.

In the modification shown by Figure 3 the upper end of the bellows is radially out-turned, but not so far as to be bent beyond the limit the metal can stand. The out-turned end is clamped between the inner peripheries of superposed rings 39, 40 forced axially towards one another against the end of the cylinder-like member 15 when the cap 32 is screwed home, the rings being thereby clamped at their outer peripheries. Moreover, in this modification the upper ring 40 is formed with a key 41 engaging a longitudinal slot 42 in the sleeve 20, to positively hold the latter against rotation. In this case the spindle 31a of the actuating mechanism is endwise located and journalled in the cap 32 and has a screw-threaded engagement with the sleeve 20 as shown.

In the embodiment of the invention shown by Figure 4 the cylinder-like body member 15a is an integral part of the body of the valve and of the cross partition 13, instead of being screwed into the body, and in this way the packing 17 of the construction of Figure 1 is not required. The openings 18a in this case may be continuous, being formed at the end of the cylinder portion 15b. The latter extends sufficiently away from the main seat 16 to ensure that the valve will not provide a free through flow except when the movable valve member is a material distance from the main seat.

In this embodiment also the block 35 of Figure 1 is replaced by a part 35a which is integral with the sleeve 20, and the latter, instead of having an integral inturn 36, carries an externally-threaded nut 36a. The part 35a, it will be noted contacts over a very small area, i. e., makes line contact, with the round head of the pin 33.

What I claim as my invention and desire to secure by Letters Patent of the United States is:—

1. In a valve, a valve body, an axially-movable valve member, a metal bellows the ends of which are maintained substantially cylindrical, concentric rings for clamping one of said ends to said valve body, other concentric rings for clamping the other of said ends to said valve member, one of said rings at each end being flexible, and means for radially distorting said flexible rings during the clamping.

2. In a valve, a valve body, an axially-movable valve member, a metal bellows the ends of which are maintained substantially cylindrical, concentric rings for clamping one of said ends to said valve body, other concentric rings for clamping the other of said ends to said valve member, one of said rings at each end being flexible and having a wedge-shaped surface co-acting with a suitable abutment, and means for forcing said flexible rings axially to effect radial compression thereof.

3. A valve comprising a body, a cylinder-like member screwed into an opening in the body and providing an annular seat, an axially-movable valve member co-acting with said seat and having its periphery of piston form co-acting with openings in said cylinder-like member, actuating mechanism for said valve member, and a metal bellows clamped to said valve member and to the remote end of said cylinder-like member, such that, by unscrewing the latter, it, said bellows, said valve member and said actuating mechanism can be removed together from the valve body.

4. In a valve, a valve body, an axially-movable valve member, a metal bellows, means for clamping one end of said bellows to said valve member, and a pair of superposed rings for clamping the other end of said bellows to said body, one of said rings being recessed to receive a bent-over end of said bellows, and one of said rings having a part slidably engaged with a longitudinal slot in said valve member to hold the latter against rotation.

5. In a valve, a valve body, an axially-movable valve member, a metal bellows secured at one end to said valve member, the other end of said bellows being maintained substantially cylindrical, concentric rings for clamping said other end to said valve body, one of said rings being flexible, and means for radially distorting said flexible ring during the clamping without subjecting said cylindrical end to twisting.

6. In a globe valve, a valve body providing a seat, a hollow cylinder-like member rigid with said body and coaxial with said seat, said member having an opening communicating with the outlet of said body, an axially-movable valve member comprising a piston valve coacting with said opening and a seating portion coacting with said seat for sealing purposes, a metal bellows connecting said piston valve with said body and disposed in the interior of said cylinder-like member so that said piston valve acts to shield said bellows when the valve is open from the full flow of the material controlled by the valve, and means supporting said piston valve and serving also for slidingly supporting said bellows internally, the opening in said cylinder-like member being disposed relatively to said seat so as only to be uncovered by said piston valve when said seating portion is some distance from said seat.

7. In a globe valve, a valve body providing a seat, a hollow cylinder-like member rigid with said body and coaxial with said seat, said member having an opening communicating with the outlet of said body, an axially-movable valve member disposed in said cylinder-like member, said valve member comprising a sleeve, a main ring forming a piston valve adapted to coact with the opening in said cylinder-like member, a seating ring adapted to coact with said seat for sealing purposes, and means securing the parts of said valve member to one another, and a metal bellows secured at one end to said body and at its other end to said main ring between the latter and said sleeve.

PHILIP KEITH SAUNDERS.